United States Patent [19]
Tobin, Jr.

[11] 3,850,286
[45] Nov. 26, 1974

[54] SEED SELECTOR

[75] Inventor: Carlton D. Tobin, Jr., Hollister, Calif.

[73] Assignee: Union Carbide Corporation, New York, N.Y.

[22] Filed: May 14, 1973

[21] Appl. No.: 360,311

Related U.S. Application Data
[63] Continuation of Ser. No. 217,317, Jan. 12, 1972, abandoned.

[52] U.S. Cl. .................. 198/210, 53/28, 214/1 BC, 221/220, 294/88, 294/100
[51] Int. Cl. ........................................... B65g 29/00
[58] Field of Search ...... 294/64 R, 65, 86.15, 86.28, 294/86.3, 86.32, 86 R, 88, 99 R, 100, 115, 116; 53/28; 221/217, 219, 220; 111/78, 77; 198/25, 210; 214/1 BC

[56] References Cited
UNITED STATES PATENTS
| | | | |
|---|---|---|---|
| 2,236,761 | 4/1941 | Nichols | 294/88 |
| 2,283,614 | 5/1942 | Schmidt | 294/88 |
| 2,320,611 | 6/1943 | Kandle | 294/100 |
| 2,800,355 | 7/1957 | Vinner et al. | 294/88 |
| 2,899,232 | 8/1959 | Walter | 294/65 |
| 3,481,641 | 12/1969 | Berger et al. | 294/100 |

*Primary Examiner*—Evon C. Blunk
*Assistant Examiner*—Johnny D. Cherry
*Attorney, Agent, or Firm*—Owen, Wickersham & Erickson

[57] ABSTRACT

A seed selector comprising a vertical cylinder blocked at both its upper and lower ends with a central opening on its lower end which flares outwardly in the downward direction. A piston in the cylinder has secured to its lower end three spring wire fingers that extend out through the central opening and spread apart therebelow, each finger having an inwardly hooked end. When fluid pressure is applied, typically as a vacuum to the upper end of the piston, the piston is raised upwardly and the fingers are moved upwardly while the hooked ends move inwardly so that they can seize between them a seed and lift the seed. Generally speaking, the device is then moved to another position and the seed is dropped by bleeding the vacuum to atmosphere so that the piston drops to its lowest position and the fingers open.

4 Claims, 3 Drawing Figures

SEED SELECTOR

CROSS REFERENCE TO RELATED APPLICATION

This application is a continuation of application Ser. No. 217,317 filed Jan. 12, 1972, now abandoned.

BACKGROUND OF THE INVENTION

This invention relates to a seed selector for lifting up a single seed from a store of seeds and for later lowering and releasing the seed.

Seed selectors of this kind may be directed to several uses, for example in seed-tape manufacturing machines or in seed planters. For example, in U.S. Pat. No. 3,511,016 and No. 3,561,187 seed-tape manufacturing devices are shown wherein a rotating device has nozzles arranged in a series around the circumference of a circle on individual arms which move down into a seed storage device and pick up a seed by vacuum and then release it when the vacuum is broken. These vacuum pickup means are quite satisfactory for use with many seeds. However, with seeds that are an odd size or shape or texture or are relatively large, these devices are not so satisfactory, and it is to these seeds that the present invention is directed. Among the seeds to which the present invention applies are those of corn, cotton, pine, acorn, other tree seeds, and beans, such as soy, snap, wax, lima, and so on, and also to other plant propagating members such as garlic cloves or small bulbs or bulblets. The seeds or bulblets must be handled very quickly and accurately and carefully, because many of the seeds or bulblets are delicate. The purpose is to pick up one at a time and be sure of picking up at least one.

A significant object of the invention is to provide a device that can be substituted for the vacuum pickup nozzles, operating with the same vacuum, bleed and pressure circuits used for such nozzles.

SUMMARY OF THE INVENTION

The seed selector of this invention may be vacuum operated, though by making some adjustments it may be operated by positive pressure. A piston inside a vertical cylinder has secured to it and extending down below the cylinder three spring wire fingers having hooked ends. These members are guided so that they flare apart and are springy so that they flare outwardly and open up when the piston is at the bottom and move up with the piston and close together as the piston is raised. Thus, when the piston is dropped to the bottom, the fingers drop into a seed tray or other store of seeds and when the piston is forced upwardly, the fingers close together as they move upwardly and carry with them a seed. Then when moved to a different position, they are lowered and drop the seed.

Other objects and advantages of the invention will appear from the following description of a preferred embodiment.

DESCRIPTION OF A PREFERRED EMBODIMENT

Figure 2:
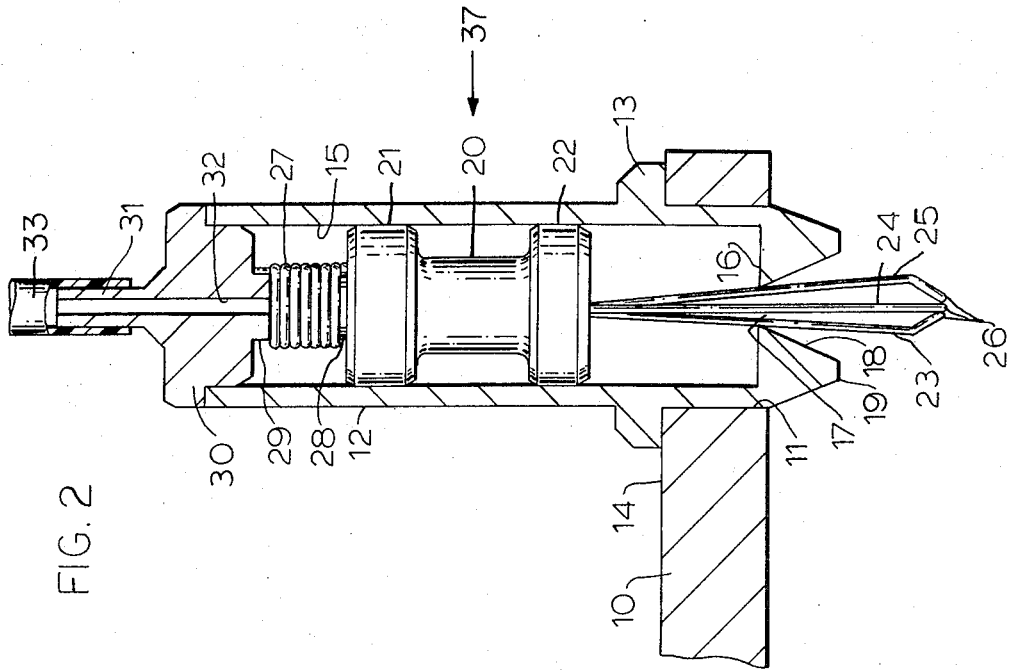
FIG. 2 is a similar view showing the same device with the seed picked up and with the piston and fingers in their uppermost position.
Figure 1:
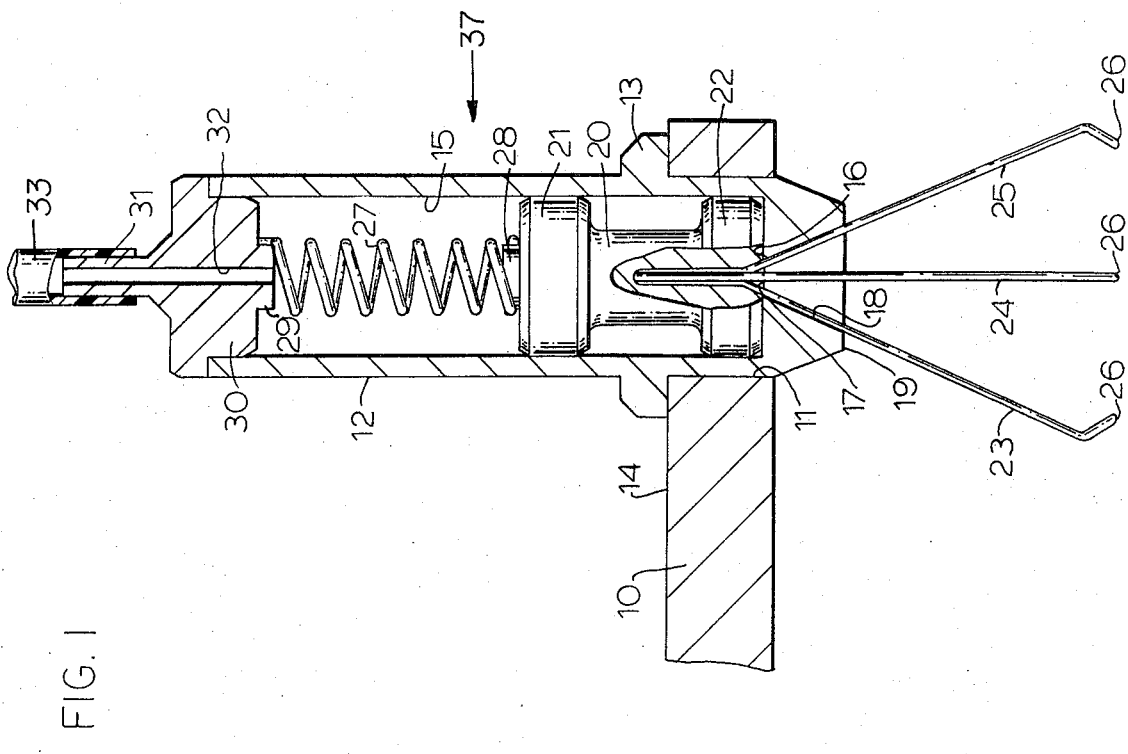
FIG. 1 is a fragmentary view in elevation and in section of a portion of a seed dispensing device embodying the principles of the invention and with the piston and fingers in their lowermost position.
Figure 3:
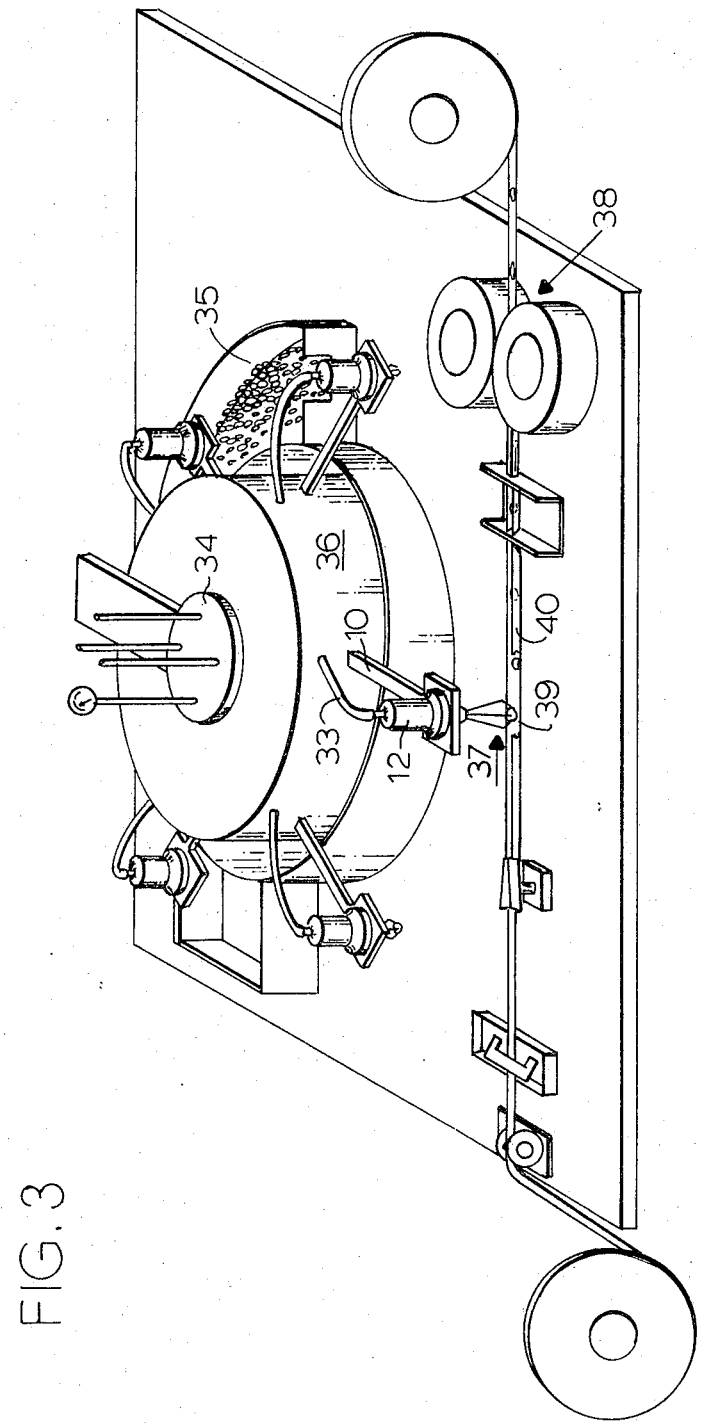
FIG. 3 is a view in perspective of a seed tape manufacturing machine incorporating the seed selector of this invention.

The drawings show an arm 10 which may be a radial arm of a seed-tape manufacturing machine (e.g., a rotating device 36 with a series of seed selectors 37) or may be some other device involving the handling of seeds. Near its outer end the arm 10 is drilled to provide a circular opening 11. In this circular opening 11 is inserted a vertical housing 12 of a seed selector 37, having a flange 13 to hold it in position by engaging the upper surface 14 of the arm 10. The inner walls of this housing 12 define a cylinder 15, and at the lower end of the cylinder 15 there is a radially extending wall 16 which may, as shown, extend substantially across the full bottom or may be a rather short portion, if that is desired. There is, in any event, a central opening 17, which is relatively small at its upper end and which has a downwardly, preferably conically outwardly flaring portion 18, leveling out the lower end 19 of the housing 12.

In the cylinder 15 is a piston 20, which may be a spool, as shown, or may be some other shape of piston. It may have O-rings or piston rings 21 and 22, as desired. Along its axis, at its lower end, it has secured to it three wire fingers 23, 24, and 25 which are made of spring wire. They extend down through and beyond the central opening 17 and the flared portion 18 and they have inwardly hooked lower ends 26.

Depending upon conditions, gravity may be used as a return for the piston 20 or positive air pressure may be used, or there may be a return spring 27, as shown here, which, as the piston 20 rises, is compressed between a guide button 28 on the upper end of the piston 20 and a guide button 29 on the top closure 30 of the cylinder 15. There may be an upper pneumatic fitting 31 on both.

The upper end of the cylinder 15, in the case of vacuum operation, is closed by a suitable closure member 30 with a central opening 32 therethrough, which leads to the fitting 31. The fitting 31 is attached by a suitable conduit 33 to a vacuum pump, not shown, or to a suitable device such as a valve 34 (which may overlie the rotating device 36) like that shown in the two U.S. patents referred to above for the introducing vacuum and then changing over to relief to atmosphere at other times.

As can be seen from the drawings, when the vacuum is applied to the fitting 31, the piston 20 of the seed selector 37 is raised and the fingers 23, 24, 25 are thereby raised, while at the same time their hooked lower ends 26 approach together in a closing action which grips a seed from the store 35 of seeds. When the vacuum is broken by a suitable valve 34 (as when the rotating device 36 rotates), air reenters the cylinder 15 and the spring 27 returns the piston 20 to the bottom end of the cylinder 15, so that the fingers 23, 24 and 25 drop and open, letting the seed go and depositing where it is desired to be deposited as at a station 39 along the seed tape 40 being translated by a seed-tape translation device 38.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In a seed-tape manufacturing device having a rotating device with a series of seed selectors arranged in a series around the circumference of a circle on individual arms, which move down into a seed storage device to pick up a seed and then move up and later release said seed on to a seed tape, the combination therewith wherein said seed selector for lifting up a single seed from said seed storage device and for later lowering and releasing the seed, includes in combination a vertical cylinder having a lower end provided with a lower radial wall having a central opening that flares outwardly in the downward direction, and an upper radial wall, and having a port at its upper end, a piston in said cylinder actuable by fluid flow through said port, and three spring wire fingers anchored to the lower end of said piston and extending out through said central opening and spreading apart therebelow, each said finger having an inwardly hooked end.

2. The combination of claim 1 having spring means urging said piston normally down against said lower radial wall.

3. A seed-tape manufacturing device comprising a seed storage device, a seed-tape translation device spaced from said seed tape storage device, and a rotating device with a series of seed selectors arranged in a series around the circumference of a circle on individual arms, said arms moving down into said seed storage device to pick up a seed, then moving it up, and later after further rotating of said rotating device release said seed on to a seed tape carried by said translation device, said seed selector, which serves for lifting up a single seed from said seed storage device and for later lowering and releasing the seed, including in combination a vertical cylinder having a lower end provided with a lower radial wall having a central opening that flares outwardly in the downward direction, and an upper radial wall, and having a port at its upper end, a piston in said cylinder actuable by fluid flow through said port, and three spring wire fingers anchored to the lower end of said piston and extending out through said central opening and spreading apart therebelow, each said finger having an inwardly hooked end.

4. The combination of claim 3 having spring means urging said piston normally down against said lower radial wall.

* * * * *